United States Patent
Zhong et al.

(10) Patent No.: US 11,645,713 B2
(45) Date of Patent: May 9, 2023

(54) METHODS AND SYSTEMS FOR DISPATCHING MULTI-REGION POWER SYSTEM

(71) Applicants: Tsinghua University, Beijing (CN); BEIJING TSINTERGY TECHNOLOGY CO., LTD., Beijing (CN)

(72) Inventors: Haiwang Zhong, Beijing (CN); Zhenfei Tan, Beijing (CN); Qing Xia, Beijing (CN); Chongqing Kang, Beijing (CN); Yang Wang, Beijing (CN); Xiaowen Lai, Beijing (CN)

(73) Assignees: TSINGHUA UNIVERSITY, Beijing (CN); BEIJING TSINTERGY TECHNOLOGY CO., LTD., Beijing (CN)

(*) Notice: Subject to any disclaimer, the term of this patent is extended or adjusted under 35 U.S.C. 154(b) by 269 days.

(21) Appl. No.: 17/177,752

(22) Filed: Feb. 17, 2021

(65) Prior Publication Data
US 2021/0358034 A1 Nov. 18, 2021

(30) Foreign Application Priority Data
May 18, 2020 (CN) .......................... 202010421946.0

(51) Int. Cl.
*G06Q 40/04* (2012.01)
*G05B 13/04* (2006.01)
(Continued)

(52) U.S. Cl.
CPC .......... *G06Q 40/04* (2013.01); *G05B 13/042* (2013.01); *G06Q 10/06313* (2013.01);
(Continued)

(58) Field of Classification Search
CPC ...... H02J 2203/20; H02J 2203/10; H02J 3/46; H02J 13/00032; Y04S 50/16; G06Q 10/04; G06Q 10/0637
See application file for complete search history.

(56) References Cited

U.S. PATENT DOCUMENTS 9,229,437 B2 * 1/2016 Kalagnanam .......... G05B 13/02

FOREIGN PATENT DOCUMENTS

AU 2019101104 A4 * 10/2019

* cited by examiner

*Primary Examiner* — Mohammad Ali
*Assistant Examiner* — Dhruvkumar Patel
(74) *Attorney, Agent, or Firm* — Hodgson Russ LLP

(57) ABSTRACT

The disclosure provides a method and a system for dispatching a multi-region power system. The method includes: obtaining, by each regional system operator, basic operating parameters of the regional power system; establishing, by each regional system operator, a dispatching model of the regional power system based on the basic operating parameters; identifying, by each regional system operator, an aggregation model of the regional power system based on the dispatching model of the regional power system; reporting, by each regional system operator, the aggregation model to the cross-region system operator; establishing, by the cross-region system operator, a reduced dispatching model of the multi-region power system based on the aggregation model from each regional system operator; and solving, by the cross-region system operator, the reduced dispatching model to obtain a dispatching result of each regional power system.

9 Claims, 1 Drawing Sheet

(51) Int. Cl.
*G06Q 10/0631* (2023.01)
*G06Q 50/06* (2012.01)
*H02J 3/48* (2006.01)
(52) U.S. Cl.
CPC ....... *G06Q 10/06315* (2013.01); *G06Q 50/06* (2013.01); *H02J 3/48* (2013.01); *H02J 2203/20* (2020.01)

METHODS AND SYSTEMS FOR DISPATCHING MULTI-REGION POWER SYSTEM

CROSS-REFERENCE TO RELATED APPLICATION

This application claims priority to Chinese Patent Application No. 202010421946.0, filed on May 18, 2020, the entire disclosure of which is incorporated by reference herein.

FIELD

The disclosure relates to the field of dispatching, operation, and control technologies of power systems, and more particularly, to a method for dispatching a multi-region power system and a system for dispatching a multi-region power system.

BACKGROUND

The multi-region power system includes regional power systems. Each regional power system corresponds to one regional system operator. The dispatching, operation, and control of the multi-region power system has become more complicated, and the cross-region power transmission among the regional power systems has become more frequent, as the large-scale construction of high-voltage transmission lines. In this context, it is necessary to coordinate and optimize the dispatching of the multi-region power system across the regions, and utilize the surplus and shortcomings of power generation resources and power loads in different regions, thus achieving optimal allocation of power generation resources in a larger space.

In the actual multi-region power system, different regional power systems are usually operated and managed by different dispatching agencies. It is difficult to develop the dispatching, operation, and control of the multi-region power system due to data private ownership in the different agencies and computing capacity limitations.

SUMMARY

In a first aspect, embodiments of the disclosure provide a method for dispatching a multi-region power system. The multi-region power system is corresponding to a cross-region system operator. The multi-region power system includes regional power systems. Each regional power system is corresponding to a regional system operator. The method includes: obtaining, by each regional system operator, basic operating parameters of the corresponding regional power system; establishing, by each regional system operator, a dispatching model of the corresponding regional power system based on the basic operating parameters of the corresponding regional power system, in which the dispatching model of the corresponding regional power system uses power flows of tie lines as parameters; identifying, by each regional system operator, an aggregation model of the corresponding regional power system based on the dispatching model of the corresponding regional power system; reporting, by each regional system operator, the aggregation model of the corresponding regional power system to the cross-region system operator; establishing, by the cross-region system operator, a reduced dispatching model of the multi-region power system based on the aggregation model of the corresponding regional power system from each regional system operator; and solving, by the cross-region system operator, the reduced dispatching model of the multi-region power system to obtain a dispatching result of each regional power system.

In a second aspect, embodiments of the disclosure provide a system for dispatching a multi-region power system. The system includes: regional power systems, regional system operators, and a cross-region system operator. Each regional power system is corresponding to one of the regional system operators. Each regional system operator includes a first memory, a first processor, and a first computer program stored on the first memory and capable of running on the first processor, and the first processor is configured to execute the first computer program to perform: obtaining basic operating parameters of the corresponding regional power system, establishing a dispatching model of the corresponding regional power system based on the basic operating parameters of the corresponding regional power system, in which the dispatching model of the corresponding regional power system uses power flows of tie lines as parameters, identifying an aggregation model of the corresponding regional power system based on the dispatching model of the corresponding regional power system, and reporting the aggregation model of the corresponding regional power system to the cross-region system operator. The cross-region system operator includes a second memory, a second processor, and a second computer program stored on the second memory and capable of running on the second processor, and the second processor is configured to execute the second computer program to perform: establishing a reduced dispatching model of the multi-region power system based on the aggregation model of the corresponding regional power system from each regional system operator, and solving the reduced dispatching model of the multi-region power system to obtain a dispatching result of each regional power system.

BRIEF DESCRIPTION OF THE DRAWINGS

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

DETAILED DESCRIPTION

In order to make objectives, technical solutions, and advantages of embodiments of the disclosure clearer, the technical solutions of the embodiments of the disclosure will be described clearly and completely in conjunction with the accompanying drawings of the embodiments of the disclosure. Obviously, the described embodiments are part embodiments of the disclosure, but not all the embodiments. Based on the embodiments of the disclosure, all other embodiments obtained by those of ordinary skill in the art without creative work shall fall within the protection scope of the disclosure.

Figure 1:
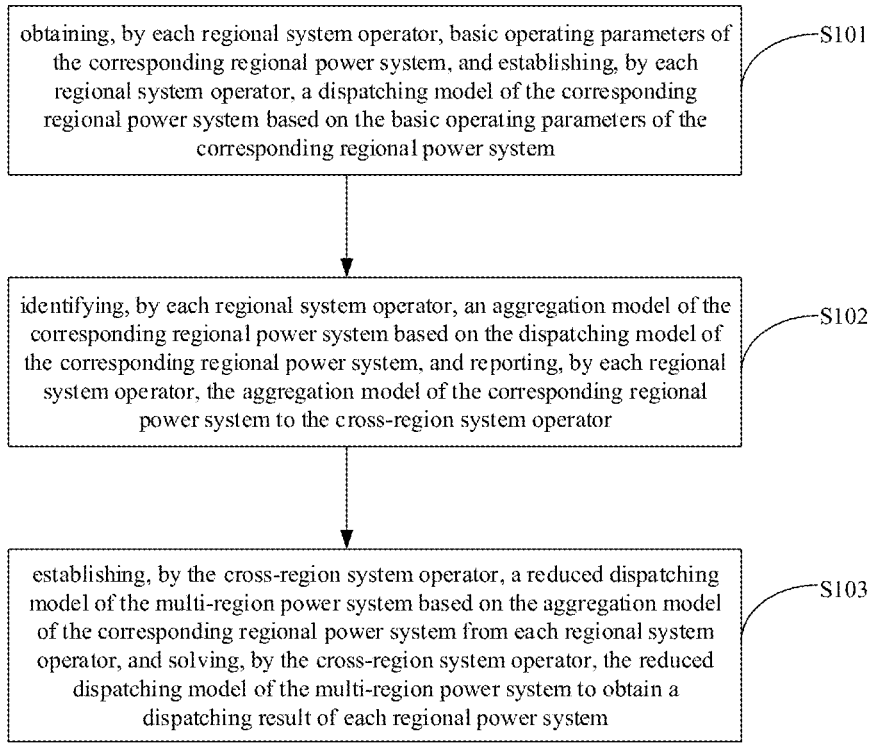
FIG. 1 is a flowchart of a method for dispatching a multi-region power system according to embodiments of the disclosure.

FIG. 1 is a flowchart of a method for dispatching a multi-region power system according to embodiments of the disclosure.

The multi-region power system is corresponding to a cross-region system operator, or the multi-region power system is controlled or operated by the cross-region system operator. The multi-region power system includes regional power systems. Each regional power system is corresponding to a regional system operator, or each regional power system is controlled or operated by the regional system operator.

As illustrated in FIG. 1, the method may include actions in the following blocks.

At block 101, each regional system operator obtains basic operating parameters of the corresponding regional power system, and establishes a dispatching model of the corresponding regional power system based on the basic operating parameters of the corresponding regional power system, in which the dispatching model of the corresponding regional power system uses power flows of tie lines as parameters.

At block 102, each regional system operator identifies an aggregation model of the corresponding regional power system based on the dispatching model of the corresponding regional power system, and reports the aggregation model of the corresponding regional power system to the cross-region system operator.

At block 103, the cross-region system operator establishes a reduced dispatching model of the multi-region power system based on the aggregation model of the corresponding regional power system from each regional system operator, and solves the reduced dispatching model of the multi-region power system to obtain a dispatching result of each regional power system.

With the method for dispatching the multi-region power system according to some embodiments of the disclosure, each regional system operator obtains basic operating parameters of the corresponding regional power system, and establishes a dispatching model of the corresponding regional power system based on the basic operating parameters of the corresponding regional power system, in which the dispatching model of the corresponding regional power system uses powers of tie lines as parameters; each regional system operator identifies an aggregation model of the corresponding regional power system based on the dispatching model of the corresponding regional power system, and reports the aggregation model of the corresponding regional power system to the cross-region system operator; and the cross-region system operator establishes a reduced dispatching model of the multi-region power system based on the aggregation model of the corresponding regional power system from each regional system operator, and solves the reduced dispatching model of the multi-region power system to obtain a dispatching result of each regional power system.

Therefore, the non-iterative coordinated and optimized dispatching of the multi-region power system may be realized through a small amount of information interaction. Each regional system operator does not need to submit complete information of the corresponding regional power system to the cross-region system operator, and there is no need for repeated iterations between the regional system operator and the cross-region system operator. The economy and solution efficiency of the dispatching of the multi-region power system may be improved.

In some embodiments, the basic operating parameters includes: an admittance matrix of nodes in the corresponding regional power system, power transfer distribution factors in the corresponding regional power system, an upper limit of active power flow of transmission branches in the corresponding regional power system, an active load of each node in the corresponding regional power system, an upper limit and a lower limit of active power of each generator in the corresponding regional power system, a bidding curve of each bidding section of each generator in the corresponding regional power system, and a remaining available transmission capacity of each cross-region tie line for connecting regions in the corresponding regional power system.

In some embodiments, each regional system operator establishes the dispatching model of the corresponding regional power system based on the basic operating parameters of the corresponding regional power system, which may include establishing an objective function of the dispatching model of the corresponding regional power system, and establishing constraints of the dispatching model of the corresponding regional power system.

The objective function (1) of the dispatching model of the corresponding regional power system is established by a formula of:

$$\min_{P_a^s} \frac{1}{2}(P_a^s)^T Q_a P_a^s + b_a^T P_a^s + c_a \qquad (1)$$

where, a represents a region of the corresponding regional power system, $P_a^s$ represents a power output column vector of each bidding section of each generator in region a, $Q_a$ represents a diagonal matrix, each diagonal element of the diagonal matrix is a quadratic coefficient of the bidding curve of each bidding section of each generator in region a, $b_a$ represents a first order coefficient of the bidding curve of each bidding section of each generator in region a, $c_a$ represents a constant of the bidding curve of each bidding section of each generator in region a, T represents a transposition operation.

The constraints (2)-(7) of the dispatching model of the corresponding regional power system are established by formulas of:

$$1^T P_a^s = 1^T M_a^t F^t + 1^T P_a^d \qquad (2)$$

$$T_a^s P_a^s - T_a^t M_a^t F^t - T_a^d P_a^d \geq -\overline{F}_a^l \qquad (3)$$

$$-T_a^s P_a^s + T_a^t M_a^t F^t + T_a^d P_a^d \geq -\overline{F}_a^l \qquad (4)$$

$$P_a^s \geq 0 \qquad (5)$$

$$-P_a^s \geq -\overline{P}_a^s \qquad (6)$$

$$\underline{F}^t \geq F^t \leq \overline{F}^t \qquad (7)$$

where, constraint (2) represents a power balance constraint of region a, in which $1^T$ represents a row vector with all 1 elements, $F^t$ represents a column vector of the power flows of the tie lines, $M_a^t$ represents an adjacency matrix of boundary nodes of region a and the tie lines, $P_a^d$ represents a column vector of active loads of nodes in the regional power system of region a, constraints (3) and (4) represent a lower limit constraint and an upper limit constraint of power flow of the transmission branches in the regional power system of region a, in which $T_a^s$ represents an active power transfer distribution factor matrix of each bidding section of each generator in region a to the transmission branches, $T_a^t$ represents an active power transfer distribution factor matrix of the boundary nodes to the transmission branches, $T_a^d$ represents an active power transfer distribution factor matrix of load nodes to the transmission branches, $\overline{F}_a^l$ represents the upper limit of active power flow of the transmission branches, constraints (5) and (6) represent a lower limit constraint and an upper limit constraint of an power output in each bidding section of each generator of region a, in which $\overline{P}_a^s$ represents an upper limit column vector of active powers of each bidding section of each generator in region a, a value range of the power flow of each tie line satisfies constraint (7).

$\underline{F}^t$ represents a lower limit column vector of the powers of the tie lines, and $\overline{F}^t$ represents an upper limit column vector of the powers of the tie lines.

In some embodiments, for any $F^t$ satisfying formula (7), the aggregation model of the corresponding regional power system has the same solution with a model of formulas (1)-(6); and the aggregation model of the corresponding regional power system is obtained through multiple values of competitive bidding sections, active power flow constraints, and a boundary equivalence of a network equation in formulas (1)-(6).

In some embodiments, the competitive bidding sections include bidding sections that do not reach bounds at the optimal solution of the dispatching model of the corresponding regional power system when there is $F^t$ satisfying formula (7). The competitive bidding sections are opposite to bidding sections reaching upper bounds constantly and bidding sections reaching lower bounds constantly. The bidding sections reaching upper bounds constantly refer to bidding sections that reach the upper bounds at the solution of the dispatching model of the corresponding regional power system when there is $F^t$ satisfying formula (7). The bidding sections reaching lower bounds constantly refer to bidding sections that reach the lower bounds at the solution of the dispatching model of the corresponding regional power system when there is $F^t$ satisfying formula (7). The active power flow constraints refer to power flow constraints of the transmission branches in the region, and reaching bounds forward or reaching bounds backward for $F^t$ satisfying formula (7). In some embodiments, the competitive bidding sections, the active power flow constraints, and the boundary equivalence of the network equation are identified by actions of:

initializing a cycle count variable k=0;

initializing a set $S_{a,L}^k$ of the bidding sections reaching lower bounds constantly and a set $S_{a,U}^k$ of the bidding sections reaching upper bounds constantly to a universal set $S_a$ of bidding sections;

initializing a set $L_{a,L}^k$ of the active power flow constraints reaching bounds backward and a set $L_{a,U}^k$ of the active power flow constraints reaching bounds forward to a null set;

updating the cycle count variable k=k+1;

solving an identifying model of the competitive bidding sections and the active power flow constraints, in which the identifying model is denoted by formulas of:

$$\max_{P_a^s, F^t, t_a, s_a} \varphi_a^k = \qquad (8)$$

$$\sum_{n \in L_a, L_{a,L}^k} (1 - t_{a,n}^-) + \sum_{n \in L_a, L_{a,U}^k} (1 - t_{a,n}^+) + \sum_{m \in S_{a,L}^k} s_{a,m}^- + \sum_{m \in S_{a,U}^k} s_{a,m}^+,$$

-continued $$\underline{F}^t \le F^t \le \overline{F}^t, \qquad (9)$$

$$1^T P_a^s = 1^T M_a^t F^t + 1^T P_a^d, \qquad (10)$$

$$0 \le T_a^s P_a^s - T_a^t M^t F^t - T_a^d P_a^d + \overline{F}_a^l \le M^{l0} t_a^-, \qquad (11)$$

$$0 \le -T_a^s P_a^s + T_a^t M^t F^t + T_a^d P_a^d + \overline{F}_a^l \le M^{l0} t_a^+, \qquad (12)$$

$$0 \le P_a^s \le M^{s0} s_a^-, \ 0 \le -P_a^s + \overline{P}_a^s \le M^{s0} s_a^+, \qquad (13)$$

$$0 \le v_a^- \le M^{l1}(1 - t_a^-), \ 0 \le v_a^+ \le M^{l1}(1 - t_a^+), \qquad (14)$$

$$0 \le \mu_a^- \le M^{s1}(1 - s_a^-), \ 0 \le \mu_a^+ \le M^{s1}(1 - s_a^+), \qquad (15)$$

$$Q_a P_a^s + b_a = \lambda_a 1 + (T_a^s)^T (v_a^- - v_a^+) + \mu_a^- - \mu_a^+, \text{ and} \qquad (16)$$

$$t_a^-, t_a^+ \in \{0, 1\}^{N^l}, s_a^-, s_a^+ \in \{0, 1\}^{N^s}, \qquad (17)$$

where, formula (8) is an objective function of the identifying model, $\varphi_a^k$ represents a value of the objective function of the identifying model at a $k^{th}$ cycle, $L_a$ represents a set of the transmission branches in the regional power system of region a, $t_{a,n}^+$ and $t_{a,n}^-$ represent a 0-1 integer variable that characterizes whether a transmission branch reaches a bound, in which $t_{a,n}^+ = 0$ means that the transmission branch n reaches the bound forward, $t_{a,n}^- = 0$ means that the transmission branch n reaches the bound backward, and otherwise the transmission branch n does not reach the bound, $s_{a,m}^+$ and $s_{a,m}^-$ represent a 0-1 integer variable that characterizes whether a bidding section reaches a bound, in which $s_{a,m}^+ = 0$ means that the bidding section m reaches an upper bound, $s_{a,m}^- = 0$ means that the bidding section m reaches a lower bound, otherwise the bidding section m does not reach the bound, constraint (9) represents a value range of the transmission power of each tie line, constraints (10)-(17) represent optimality conditions of the dispatching model of the corresponding regional power system uses the power flows of the tie lines as the parameters, $\lambda_a$ represents a dual multiplier of constraint (2), $v_a^-$ and $v_a^+$ represent dual multipliers of constraint (3) and constraint (4), $\mu_a^-$ and $\mu_a^+$ represent dual multipliers of constraint (5) and constraint (6), $N_l$ represents a number of the transmission branches of the corresponding regional power system, $N_s$ represents a number of the bidding sections of the corresponding regional power system, $M^{l0}$, $M^{s0}$, $M^{l1}$, and $M^{s1}$ represent positive real numbers, $M^{l0}$ has a value of $2 \times \max \overline{F}_a^l$, $M^{s0}$ has a value of $\max \overline{P}_a^s$, $M^{l1}$ and $M^{s1}$ each has a value of 10 times of a highest biding of generators in the corresponding regional power system, solving the identifying model by a branch-cut-plane algorithm or by calling a commercial solver, in which for the $k^{th}$ cycle, an integer solution of the identifying model is denoted as $\hat{t}_a^{-k}$, $\hat{t}_a^{+k}$, $\hat{s}_a^{-k}$, and $\hat{t}_a^{+k}$, and a value of the objective function of the identifying model is denoted as $\hat{\varphi}_a^k$, in the $k^{th}$ cycle, a set of bidding sections (i.e., $\hat{s}_{a,m}^{-k} = 1$) that have not reached the lower bound is denoted as $J_{a,L}^k$, a set of bidding sections (i.e., $\hat{s}_{a,m}^{+k}=1$) that have not reached the upper bound is denoted as $J_{a,U}^{k}$, a set of transmission branches (i.e., $\hat{t}_{a,n}^{-k}=0$) that reach the lower bound of transmission power is denoted as $K_{a,L}^{k}$, a set of transmission branches (i.e., $\hat{t}_{a,n}^{+k}=0$) that reach the upper bound of transmission power is denoted as $K_{a,U}^{k}$, deleting the set $J_{a,L}^{k}$ from the set $S_{a,L}^{k}$, in which $S_{a,L}^{k} = S_{a,L}^{k} \setminus J_{a,L}^{k}$, deleting the set $J_{a,U}^{k}$ from the set $S_{a,U}^{k}$, in which $S_{a,U}^{k} = S_{a,U}^{k} \setminus J_{a,U}^{k}$, adding the set $K_{a,L}^{k}$ into the set $L_{a,L}^{k}$, in which $L_{a,L}^{k} = L_{a,L}^{k} \cup K_{a,L}^{k}$, adding the set $K_{a,U}^{k}$ into the set $L_{a,U}^{k}$, which $L_{a,U}^{k} = L_{a,U}^{k} \cup K_{a,U}^{k}$, updating the cycle count variable when $\hat{\varphi}_a^k > 0$ and entering a next cycle;

terminating when $\hat{\varphi}_a^k = 0$, in which the set $S_{a,L}$ of the bidding sections reaching lower bounds constantly is obtained by $S_{a,L} = S_{a,L}^{k}$, the set $S_{a,U}$ of the bidding sections reaching upper bounds constantly is obtained by $S_{a,U} = S_{a,U}^{k}$, the set $S_{a,C}$ of the competitive bidding sections is obtained by $S_{a,C} = S_a \setminus (S_{a,L} \cup S_{a,U})$, the set $L_{a,L}$ of the active power flow constraints reaching bounds backward is obtained by $L_{a,L} = L_{a,L}^{k}$, and the set $L_{a,U}$ of the active power flow constraints reaching bounds forward is obtained by $L_{a,U} = L_{a,U}^{k}$;

the boundary of the network equation is equivalent to an equation relationship among a phase angle of each boundary node of the corresponding regional power system, a power of each competitive bidding section of the corresponding regional power system, and a transmission power of each tie line connected in the region;

the bidding sections reaching upper bounds constantly are fixed at the upper bounds and the bidding sections reaching lower bounds constantly are fixed at the lower bound, internal nodes are eliminated from the network equation to obtain a network equation boundary equivalent value as a formula of:

$$Y_a^b \theta_a^b = -M_a^t F^t - Y_a^{bi}(Y_a^{ii})^{-1} M_{a,S_a,C}^s P_{a,S_a,C}^s - Y_a^{bi}(Y_a^{ii})^{-1}(M_{a,S_a,U}^s P_{a,S_a,U}^s - P_a^d) \quad (18),$$

where, $Y_a^b$ represents a Norton admittance matrix of the boundary nodes in region a, in which $Y_a^b = Y_a^{bb} - Y_a^{bi}(Y_a^{ii})^{-1}Y_a^{ib}$, $Y_a^{bb}$ represents a block of the Norton admittance matrix for the boundary nodes and the boundary nodes, $Y_a^{bi}$ represents a block of the Norton admittance matrix for the boundary nodes and interior nodes, $Y_a^{ib}$ represents a block of the Norton admittance matrix for the interior nodes and the boundary nodes, and $Y_a^{ii}$ represents a block of the Norton admittance matrix for the interior nodes and the interior nodes, $\theta_a^b$ represents a phase angle of the boundary node, $M_{a,S_U}^s$ represents a correlation matrix between the nodes and the competitive bidding sections, $M_{a,S_U}^s$ represents a correlation matrix between the nodes and the bidding sections reaching upper bounds constantly.

In some embodiments, establishing, by the cross-region system operator, the reduced dispatching model of the multi-region power system based on the aggregation model of the corresponding regional power system from each regional system operator, includes:

fixing the bidding sections reaching upper bounds constantly at the upper bounds and the bidding sections reaching lower bounds constantly at the lower bound, eliminating ineffective power flow constraints, and establishing the reduced dispatching model of the multi-region power system as formulas of:

$$\min_{P_{a,S_a,C}^s, \theta_a^b} \sum_{a=1}^{A} \frac{1}{2}(P_{a,S_a,C}^s)^T Q_{a,S_a,C} P_{a,S_a,C}^s + b_{a,S_a,C}^T P_{a,S_a,C}^s + \tilde{c}_a, \quad (19)$$

$$Y_a^b \theta_a^b = -M_a^t F^t - Y_a^{bi}(Y_a^{ii})^{-1} M_{a,S_a,C}^s P_{a,S_a,C}^s - \quad (20)$$
$$Y_a^{bi}(Y_a^{ii})^{-1}(M_{a,S_a,U}^s \overline{P}_{a,S_a,U}^s - P_a^d), a = 1, \ldots, A$$

$$T_{a,L_a,L}^s S_{a,C} P_{a,S_a,C}^s - T_{a,L_a,L}^t M_a^t F^t \geq \tilde{F}_{a,L_a,L}^l, a = 1, \ldots, A \quad (21)$$

$$-T_{a,L_a,U}^s S_{a,C} P_{a,S_a,C}^s + T_{a,L_a,U}^t M_a^t F^t \geq -\tilde{F}_{a,L_a,U}^l, a = 1, \ldots, A \quad (22)$$

$$0 \leq P_{a,S_a,C}^s \leq \overline{P}_{a,S_a,C}^s, a = 1, \ldots, A \text{ and} \quad (23)$$

$$F^t = \hat{y}^t(M^t)^T \theta^b, \underline{F}^t \leq F^t \leq \overline{F}^t \quad (24)$$

where, an objective function (19) of the reduced dispatching model of the multi-region power system is to minimize a total power generation cost of each competitive bidding section in each region, A is a number of regions;

$$\tilde{c}_a = c_a + \frac{1}{2}(\overline{P}_{a,S_a,U}^s)^T Q_{a,S_a,U} \overline{P}_{a,S_a,U}^s + b_{a,S_a,U}^T \overline{P}_{a,S_a,U}^s$$

constraint (20) is an equivalent value of the boundary of the network equation of each region, constraints (21) and (22) are a backward active power flow constraint and a forward active power flow constraint of each region, in which, $$\tilde{F}_{a,L_a,L}^l = -\overline{F}_{a,L_a,L}^l - T_{a,L_a,L} S_{a,U} \overline{P}_{a,S_a,U}^s + T_{a,L_a,L}^s P_a^d, \text{ and}$$

$$\tilde{F}_{a,L_a,U}^l = \overline{F}_{a,L_a,U}^l - T_{a,L_a,U} S_{a,U} \overline{P}_{a,S_a,U}^s + T_{a,L_a,U}^s P_a^d,$$

constraint (23) is an upper and lower limit constraint of power of each competitive bidding section, constraint (24) is a power flow constraint of the tie lines, $\hat{y}^t$ is a diagonal matrix with a reciprocal of a reactance of each tie line as diagonal elements, $M^t$ is an incidence matrix of the boundary nodes and the tie lines, $M^t = [M_1^t, \ldots, M_A^t]^T$, $\theta^b$ is a phase angle column vector of the boundary nodes.

In some embodiments, solving, by the cross-region system operator, the reduced dispatching model of the multi-region power system to obtain the dispatching result of each regional power system, comprises:

solving the formulas (19)-(24) through a simplex algorithm or a commercial solver;

in which a solution of the reduced dispatching model of the multi-region power system is the dispatching result of each regional power system.

The simplex algorithm is to find one simplex from the linear equation group, each simplex can obtain a set of solutions, and then it is judged the set of solutions to make the value of the objective function to increase or decrease to decide the simplex of the next step. Through optimization iteration, the objective function achieves the maximum or minimum value.

The commercial solver mainly uses CPLEX and GUROBI solver. CPLEX is specifically used to solve large-scale linear programming (LP), quadratic programming (QP), constrained quadratic programming (QCQP), second-order cone programming (SOCP), and the corresponding mixed integer programming (MIP) problem.

Figure 2:
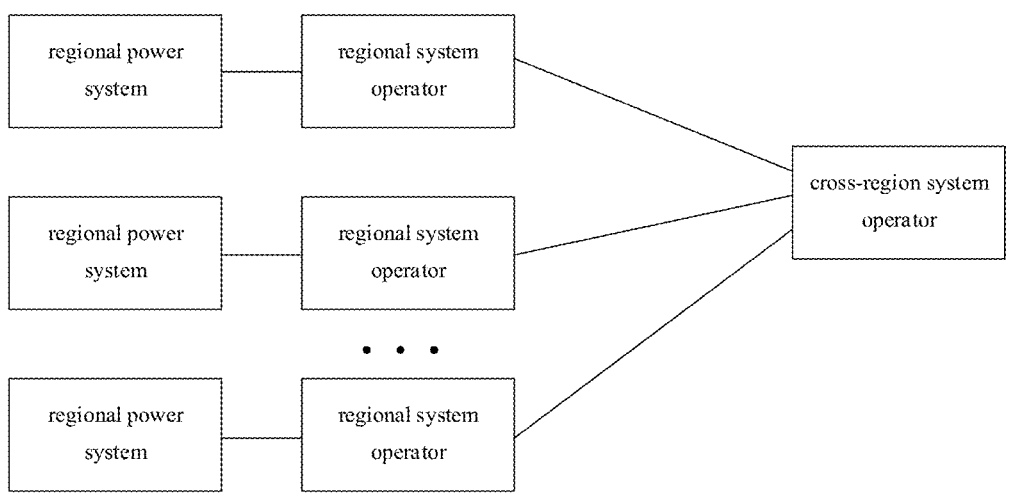
FIG. 2 is a block diagram of a system for dispatching a multi-region power system according to embodiments of the disclosure.

FIG. 2 is a block diagram of a system for dispatching a multi-region power system.

As illustrated in FIG. 2, the system includes: regional power systems, regional system operators, and a cross-region system operator.

Each regional power system is corresponding to one of the regional system operators.

Each regional system operator includes a first memory, a first processor, and a first computer program stored on the first memory and capable of running on the first processor.

The first processor is configured to execute the first computer program to perform: obtaining basic operating parameters of the corresponding regional power system, establishing a dispatching model of the corresponding regional power system based on the basic operating parameters of the corresponding regional power system, in which the dispatching model of the corresponding regional power system uses power flows of tie lines as parameters, identifying an aggregation model of the corresponding regional power system based on the dispatching model of the corresponding regional power system, and reporting the aggregation model of the corresponding regional power system to the cross-region system operator.

The cross-region system operator includes a second memory, a second processor, and a second computer program stored on the second memory and capable of running on the second processor.

The second processor is configured to execute the second computer program to perform: establishing a reduced dispatching model of the multi-region power system based on the aggregation model of the corresponding regional power system from each regional system operator, and solving the reduced dispatching model of the multi-region power system to obtain a dispatching result of each regional power system.

The detail of the process of performing by the first processor and the process of performing by the second processor may be referred to the above method embodiments, which is not repeated herein.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for dispatching a multi-region power system, wherein the multi-region power system is corresponding to a cross-region system operator, the multi-region power system comprises regional power systems, each regional power system is corresponding to a regional system operator, and the method comprises:

obtaining, by each regional system operator, basic operating parameters of the corresponding regional power system;

establishing, by each regional system operator, a dispatching model of the corresponding regional power system based on the basic operating parameters of the corresponding regional power system, in which the dispatching model of the corresponding regional power system uses power flows of tie lines as parameters;

identifying, by each regional system operator, an aggregation model of the corresponding regional power system based on the dispatching model of the corresponding regional power system;

reporting, by each regional system operator, the aggregation model of the corresponding regional power system to the cross-region system operator;

establishing, by the cross-region system operator, a reduced dispatching model of the multi-region power system based on the aggregation model of the corresponding regional power system from each regional system operator;

solving, by the cross-region system operator, the reduced dispatching model of the multi-region power system to obtain a dispatching result of each regional power system; and dispatching, by the cross-region system operator, the multi-region power system according to the dispatching result of each regional power system.

2. The method of claim 1, wherein, the basic operating parameters comprises:

an admittance matrix of nodes in the corresponding regional power system, power transfer distribution factors in the corresponding regional power system, an upper limit of active power flow of transmission branches in the corresponding regional power system, an active load of each node in the corresponding regional power system, an upper limit and a lower limit of active power of each generator in the corresponding regional power system, a bidding curve of each bidding section of each generator in the corresponding regional power system, and a remaining available transmission capacity of each cross-region tie line for connecting regions in the corresponding regional power system.

3. The method of claim 2, wherein, the dispatching model of the corresponding regional power system comprises an objective function and constraints of the corresponding regional power system, the objective function of the corresponding regional power system is denoted by a formula of:

$$\min_{P_a^s} \frac{1}{2}(P_a^s)^T Q_a P_a^s + b_a^T P_a^s + c_a \qquad (1)$$

where, a represents a region of the corresponding regional power system, $P_a^s$ represents a power output column vector of each bidding section of each generator in region a, $Q_a$ represents a diagonal matrix, each diagonal element of the diagonal matrix is a quadratic coefficient of the bidding curve of each bidding section of each generator in region a, $b_a$ represents a first order coefficient of the bidding curve of each bidding section of each generator in region a, $c_a$ represents a constant of the bidding curve of each bidding section of each generator in region a, T represents a transposition operation; and the constraints of the corresponding regional power system are denoted by formulas of:

$$1^T P_a^s = 1^T M_a^t F^t + 1^T P_a^d \qquad (2)$$

$$T_a^s P_a^s - T_a^t M_a^t F^t - T_a^d P_a^d \geq -\overline{F}_a^l \qquad (3)$$

$$-T_a^s P_a^s + T_a^t M_a^t F^t + T_a^d P_a^d \geq -\overline{F}_a^l \qquad (4)$$

$$P_a^s \geq 0 \qquad (5)$$

$$-P_a^s \geq -\overline{P}_a^s \qquad (6)$$

$$\underline{F}^t \leq F^t \leq \overline{F}^t \qquad (7)$$

where, constraint (2) represents a power balance constraint of region a, in which $1^T$ represents a row vector with all 1 elements, $F^t$ represents a column vector of the power flows of the tie lines, $M_a^t$ represents an adjacency matrix of boundary nodes of region a and the tie lines, $P_a^d$ represents a column vector of active loads of nodes of region a, constraints (3) and (4) represent a lower limit constraint and an upper limit constraint of power flow of the transmission branches in region a, in which $T_a^s$ represents an active power transfer distribution factor matrix of each bidding section of each generator in region a to the transmission branches, $T_a^t$ represents an active power transfer distribution factor matrix of the boundary nodes to the transmission branches, $T_a^d$ represents an active power transfer distribution factor matrix of load nodes to the transmission branches, $\overline{F}_a^l$ represents the upper limit of active power flow of the transmission branches, constraints (5) and (6) represent a lower limit constraint and an upper limit constraint of an power output in each bidding section of each generator of region a, in which $\overline{P}_a^s$ represents an upper limit column vector of active powers of each bidding section of each generator in region a, $\underline{F}^t$ represents a lower limit column vector of the powers of the tie lines, and $\overline{F}^t$ represents an upper limit column vector of the powers of the tie lines.

4. The method of claim 3, wherein, for $F^t$ satisfying formula (7), the aggregation model of the corresponding regional power system has the same solution with a model of formulas (1)-(6); and the aggregation model of the corresponding regional power system is obtained through multiple values of competitive bidding sections, active power flow constraints, and a boundary equivalence of a network equation in formulas (1)-(6).

5. The method of claim 4, wherein, the competitive bidding sections comprise bidding sections that do not reach bounds at the solution of the dispatching model of the corresponding regional power system when there is $F^t$ satisfying formula (7), the competitive bidding sections are opposite to bidding sections reaching upper bounds constantly and bidding sections reaching lower bounds constantly, the bidding sections reaching upper bounds constantly refer to bidding sections that reach the upper bounds at the solution of the dispatching model of the corresponding regional power system when there is $F^t$ satisfying formula (7), the bidding sections reaching lower bounds constantly refer to bidding sections that reach the lower bounds at the solution of the dispatching model of the corresponding regional power system when there is $F^t$ satisfying formula (7), and the active power flow constraints refer to power flow constraints of the transmission branches in the region, and reaching bounds forward or reaching bounds backward for $F^t$ satisfying formula (7).

6. The method of claim 5, wherein, the competitive bidding sections, the active power flow constraints, and the boundary equivalence of the network equation are identified by actions of:

initializing a cycle count variable k=0;

initializing a set $S_{a,L}^k$ of the bidding sections reaching lower bounds constantly and a set $S_{a,U}^k$ of the bidding sections reaching upper bounds constantly to a universal set $S_a$ of bidding sections;

initializing a set $L_{a,L}^k$ of the active power flow constraints reaching bounds backward and a set $L_{a,U}^k$ of the active power flow constraints reaching bounds forward to a null set;

updating the cycle count variable k=k+1;

solving an identifying model of the competitive bidding sections and the active power flow constraints, in which the identifying model is denoted by formulas of:

$$\max_{P_a^s, F^t, t_a, s_a} \varphi_a^k = \qquad (8)$$

$$\sum_{n \in L_a, L_{a,L}^k} (1 - t_{a,n}^-) + \sum_{n \in L_a, L_{a,U}^k} (1 - t_{a,n}^+) + \sum_{m \in S_{a,L}^k} s_{a,m}^- + \sum_{m \in S_{a,U}^k} s_{a,m}^+,$$

$$\underline{F}^t \le F^t \le \overline{F}^t, \qquad (9)$$

$$1^T P_a^s = 1^T M_a^t F^t + 1^T P_a^d, \qquad (10)$$

$$0 \le T_a^s P_a^s - T_a^t M^t F^t - T_a^d P_a^d + \overline{F}_a^l \le M^{l0} t_a^-, \qquad (11)$$

$$0 \le -T_a^s P_a^s + T_a^t M^t F^t + T_a^d P_a^d + \overline{F}_a^l \le M^{l0} t_a^+, \qquad (12)$$

$$0 \le P_a^s \le M^{s0} s_a^-, \ 0 \le -P_a^s + \overline{P}_a^s \le M^{s0} s_a^+, \qquad (13)$$

$$0 \le v_a^- \le M^{l1}(1 - t_a^-), \ 0 \le v_a^+ \le M^{l1}(1 - t_a^+), \qquad (14)$$

$$0 \le \mu_a^- \le M^{s1}(1 - s_a^-), \ 0 \le \mu_a^+ \le M^{s1}(1 - s_a^+), \qquad (15)$$

$$Q_a P_a^s + b_a = \lambda_a 1 + (T_a^s)^T (v_a^- - v_a^+) + \mu_a^- - \mu_a^+, \text{ and} \qquad (16)$$

$$t_a^-, t_a^+ \in \{0, 1\}^{Nl}, s_a^-, s_a^+ \in \{0, 1\}^{Ns}, \qquad (17)$$

where, formula (8) is an objective function of the identifying model, $\varphi_a^k$ represents a value of the objective function of the identifying model at a $k^{th}$ cycle, $L_a$ represents a set of the transmission branches in region a, $t_{a,n}^+$ and $t_{a,n}^-$ represent a 0-1 integer variable that characterizes whether a transmission branch reaches a bound, in which $t_{a,n}^+=0$ means that the transmission branch n reaches the bound forward, $t_{a,n}^-=0$ means that the transmission branch n reaches the bound backward, and otherwise the transmission branch n does not reach the bound, $s_{a,m}^+$ and $s_{a,m}^-$ represent a 0-1 integer variable that characterizes whether a bidding section reaches a bound, in which $s_{a,m}^+=0$ means that the bidding section m reaches an upper bound, $s_{a,m}^-=0$ means that the bidding section m reaches a lower bound, otherwise the bidding section m does not reach the bound, constraint (9) represents a value range of the transmission power of each tie line, constraints (10)-(17) represent optimality conditions of the dispatching model of the corresponding regional power system uses the power flows of the tie lines as the parameters, $\lambda_a$ represents a dual multiplier of constraint (2), $v_a^-$ and $v_a^+$ represent dual multipliers of constraint (3) and constraint (4), $\mu_a^-$ and $\mu_a^+$ represent dual multipliers of constraint (5) and constraint (6), $N_l$ represents a number of the transmission branches of the corresponding regional power system, $N_s$ represents a number of the bidding sections of the corresponding regional power system, $M^{l0}$, $M^{s0}$, $M^{l1}$, and $M^{s1}$ represent positive real numbers, $M^{l0}$ has a value of $2 \times \max \overline{F}_a^l$, $M^{s0}$ has a value of $\max \overline{P}_a^s$, $M^{l1}$ and $M^{s1}$ each has a value of 10 times of a highest biding of generators in the corresponding regional power system, solving the identifying model by a branch-cut-plane algorithm or by calling a commercial solver, in which for the $k^{th}$ cycle, an integer solution of the identifying model is denoted as $\hat{t}_a^{-k}$, $\hat{t}_a^{+k}$, $\hat{s}_a^{-k}$, and $\hat{t}_a^{+k}$, and a value of the objective function of the identifying model is denoted as $\hat{\varphi}_a^k$, in the $k^{th}$ cycle, a set of bidding sections that have not reached the lower bound is k denoted as $J_{a,L}^k$, a set of bidding sections that have not reached the upper bound is denoted as $J_{a,U}^k$, a set of transmission branches that reach the lower bound of transmission power is denoted as $K_{a,L}^k$, a set of transmission branches that reach the upper bound of transmission power is denoted as $K_{a,U}^k$, deleting the set $J_{a,L}^k$ from the set $S_{a,L}^k$, in which $S_{a,L}^k = S_{a,L}^k \setminus J_{a,L}^k$, deleting the set $J_{a,U}^k$ from the set $S_{a,U}^k$, in which $S_{a,U}^k = S_{a,U}^k \setminus J_{a,U}^k$, adding the set $K_{a,L}^k$ into the set $L_{a,L}^k$, in which $L_{a,L}^k = L_{a,L}^k \cup K_{a,L}^k$, adding the set $K_{a,U}^k$ into the set $L_{a,U}^k$, which $L_{a,U}^k = L_{a,U}^k \cup K_{a,U}^k$, updating the cycle count variable when $\hat{\varphi}_a^k > 0$ and entering a next cycle;

terminating when $\hat{\varphi}_a^k = 0$, in which the set $S_{a,L}$ of the bidding sections reaching lower bounds constantly is obtained by $S_{a,L} = S_{a,L}^k$, the set $S_{a,U}$ of the bidding sections reaching upper bounds constantly is obtained by $S_{a,U} = S_{a,U}^k$, the set $S_{a,C}$ of the competitive bidding sections is obtained by $S_{a,C} = S_a \setminus (S_{a,L} \cup S_{a,U})$, the set $L_{a,L}$ of the active power flow constraints reaching bounds backward is obtained by $L_{a,L} = L_{a,L}^k$, and the set $L_{a,U}$ of the active power flow constraints reaching bounds forward is obtained by $L_{a,U} = L_{a,U}^k$;

the boundary of the network equation is equivalent to an equation relationship among a phase angle of each boundary node of the corresponding regional power system, a power of each competitive bidding section of the corresponding regional power system, and a transmission power of each tie line connected in the region;

the bidding sections reaching upper bounds constantly are fixed at the upper bounds and the bidding sections reaching lower bounds constantly are fixed at the lower bound, internal nodes are eliminated from the network equation to obtain a network equation boundary equivalent value as a formula of:

$$Y_a^b \theta_a^b = -M_a^t F^t - Y_a^{bi}(Y_a^{ii})^{-1} M_{a,S_{a,C}}^s {}^s P_{a,S_{a,C}}^s - Y_a^{bi}(Y_a^{ii})^{-1}(M_{a,S_{a,U}}^s {}^s P_{a,S_{a,U}}^s - P_a^d) \quad (18),$$

where, $Y_a^b$ represents a Norton admittance matrix of the boundary nodes in region a, in which $Y_a^b = Y_a^{bb} - Y_a^{bi}(Y_a^{ii})^{-1} Y_a^{ib}$, $Y_a^{bb}$ represents a block of the Norton admittance matrix for the boundary nodes and the boundary nodes, $Y_a^{bi}$ represents a block of the Norton admittance matrix for the boundary nodes and interior nodes, $Y_a^{ib}$ represents a block of the Norton admittance matrix for the interior nodes and the boundary nodes, and $Y_a^{ii}$ represents a block of the Norton admittance matrix for the interior nodes and the interior nodes, $\theta_a^b$ represents a phase angle of the boundary node, $M_{a,S_U}^s$ represents a correlation matrix between the nodes and the competitive bidding sections, $M_{a,S_U}^s$ represents a correlation matrix between the nodes and the bidding sections reaching upper bounds constantly.

7. The method of claim 6, wherein, establishing, by the cross-region system operator, the reduced dispatching model of the multi-region power system based on the aggregation model of the corresponding regional power system from each regional system operator, comprises:

fixing the bidding sections reaching upper bounds constantly at the upper bounds and the bidding sections reaching lower bounds constantly at the lower bound, eliminating ineffective power flow constraints, and establishing the reduced dispatching model of the multi-region power system as formulas of:

$$\min_{P_{a,S_{a,C}}^s, \theta_a^b} \sum_{a=1}^{A} \frac{1}{2}(P_{a,S_{a,C}}^s)^T Q_{a,S_{a,C}} P_{a,S_{a,C}}^s + b_{a,S_{a,C}}^T P_{a,S_{a,C}}^s + \tilde{c}_a, \quad (19)$$

$$Y_a^b \theta_a^b = -M_a^t F^t - Y_a^{bi}(Y_a^{ii})^{-1} M_{a,S_{a,C}}^s P_{a,S_{a,C}}^s - \quad (20)$$
$$Y_a^{bi}(Y_a^{ii})^{-1}(M_{a,S_{a,U}}^s \overline{P}_{a,S_{a,U}}^s - P_a^d), a = 1, \ldots, A$$

$$T_{a,L_{a,L},S_{a,C}}^s P_{a,S_{a,C}}^s - T_{a,L_{a,L}}^t M_a^t F^t \geq \tilde{F}_{a,L_{a,L}}^l, a = 1, \ldots, A \quad (21)$$

$$-T_{a,L_{a,U},S_{a,C}}^s P_{a,S_{a,C}}^s + T_{a,L_{a,U}}^t M_a^t F^t \geq -\tilde{F}_{a,L_{a,U}}^l, a = 1, \ldots, A \quad (22)$$

$$0 \leq P_{a,S_{a,C}}^s \leq \overline{P}_{a,S_{a,C}}^s, a = 1, \ldots, A \text{ and} \quad (23)$$

$$F^t = \hat{y}^t (M^t)^T \theta^b, \underline{F}^t \leq F^t \leq \overline{F}^t \quad (24)$$

where, an objective function (19) of the reduced dispatching model of the multi-region power system is to minimize a total power generation cost of each competitive bidding section in each region, A is a number of regions;

$$\tilde{c}_a = c_a + \frac{1}{2}(\overline{P}_{a,S_{a,U}}^s)^T Q_{a,S_{a,U}} \overline{P}_{a,S_{a,U}}^s + b_{a,S_{a,U}}^T \overline{P}_{a,S_{a,U}}^s$$

constraint (20) is an equivalent value of the boundary of the network equation of each region, constraints (21) and (22) are a backward active power flow constraint and a forward active power flow constraint of each region, in which, $$\tilde{F}_{a,L_{a,L}}^l = -\overline{F}_{a,L_{a,L}}^l - T_{a,L_{a,L},S_{a,U}} {}^s \overline{P}_{a,S_{a,U}}^s + T_{a,L_{a,L}} {}^s P_a^d, \text{ and}$$

$$\tilde{F}_{a,L_{a,U}}^l = \overline{F}_{a,L_{a,U}}^l - T_{a,L_{a,U},S_{a,U}} {}^s \overline{P}_{a,S_{a,U}}^s + T_{a,L_{a,U}} {}^s P_a^d,$$

constraint (23) is an upper and lower limit constraint of power of each competitive bidding section, constraint (24) is a power flow constraint of the tie lines, constraint (24) is a power flow constraint of the tie lines, $\hat{y}^t$ is a diagonal matrix with a reciprocal of a reactance of each tie line as diagonal elements, $M^t$ is an incidence matrix of the boundary nodes and the tie lines, $M^t = [M_1^t, \ldots, M_A^t]^T$, $\theta^b$ is a phase angle column vector of the boundary nodes.

8. The method of claim 7, wherein solving, by the cross-region system operator, the reduced dispatching model of the multi-region power system to obtain the dispatching result of each regional power system, comprises:

solving the formulas (19)-(24) through a simplex algorithm or a commercial solver;

in which a solution of the reduced dispatching model of the multi-region power system is the dispatching result of each regional power system.

9. A system for dispatching a multi-region power system, comprising:

regional power systems;

regional system operators, in which each regional power system is corresponding to one of the regional system operators, and each regional system operator comprising a first memory, a first processor, and a first computer program stored on the first memory and capable of running on the first processor, and the first processor is configured to execute the first computer program to perform: obtaining basic operating parameters of the corresponding regional power system, establishing a dispatching model of the corresponding regional power system based on the basic operating parameters of the corresponding regional power system, in which the dispatching model of the corresponding regional power system uses power flows of tie lines as parameters, identifying an aggregation model of the corresponding regional power system based on the dispatching model of the corresponding regional power system, and reporting the aggregation model of the corresponding regional power system to the cross-region system operator; and a cross-region system operator comprising a second memory, a second processor, and a second computer program stored on the second memory and capable of running on the second processor, and the second processor is configured to execute the second computer program to perform: establishing a reduced dispatching model of the multi-region power system based on the aggregation model of the corresponding regional power system from each regional system operator, and solving the reduced dispatching model of the multi-region power system to obtain a dispatching result of each regional power system; and dispatching the multi-region power system according to the dispatching result of each regional power system.

* * * * *